(12) United States Patent
Shi et al.

(10) Patent No.: US 9,783,244 B2
(45) Date of Patent: Oct. 10, 2017

(54) HOLLOW STRUCTURE BODY AND VEHICULAR COMPONENT

(71) Applicant: Teijin Limited, Osaka-shi, Osaka (JP)

(72) Inventors: Jianwei Shi, Osaka (JP); Hiroyuki Shimizu, Osaka (JP); Kouhei Oka, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

(21) Appl. No.: 14/779,224

(22) PCT Filed: Mar. 13, 2015

(86) PCT No.: PCT/JP2015/057517
§ 371 (c)(1),
(2) Date: Sep. 22, 2015

(87) PCT Pub. No.: WO2015/141588
PCT Pub. Date: Sep. 24, 2015

(65) Prior Publication Data
US 2016/0052565 A1    Feb. 25, 2016

(30) Foreign Application Priority Data

Mar. 18, 2014 (JP) .................................. 2014-054962

(51) Int. Cl.
*B62D 29/04* (2006.01)
*B29D 22/00* (2006.01)
(Continued)

(52) U.S. Cl.
CPC .............. *B62D 29/04* (2013.01); *B29C 65/02* (2013.01); *B29C 66/547* (2013.01);
(Continued)

(58) Field of Classification Search
CPC ........................... B29D 22/00; B29L 2022/00
(Continued)

(56) References Cited

U.S. PATENT DOCUMENTS 9,132,859 B2   9/2015 Yamaji et al.
2013/0017406 A1   1/2013 Kinefuchi et al.
(Continued)

FOREIGN PATENT DOCUMENTS

EP   1617098 A2   1/2006
JP   2006-027433 A   2/2006
(Continued)

OTHER PUBLICATIONS

May 26, 2015—(WO) Written Opinion of ISA—Intl App PCT/JP2015/057517.

*Primary Examiner* — Vincent A Tatesure
(74) *Attorney, Agent, or Firm* — Banner & Witcoff, Ltd.

(57) ABSTRACT

According to one aspect of the present invention, there is provided a hollow structure body having a hollow structure, in which a first shaped product constituted by a first fiber-reinforced resin material containing first reinforcing fibers and a first matrix resin and a second shaped product constituted by a second fiber-reinforced resin material containing second reinforcing fibers and a second matrix resin are combined,
wherein in an arbitrary cross section in a direction perpendicular to an axial direction of the hollow structure, a ratio Sc/St between compressive strength Sc of a structure in the first shaped product and tensile strength St of a structure in the second shaped product satisfies formula (1):

$$(\sigma c/\sigma t)*(Hc/Ht)<(Sc/St)<(\sigma t/\sigma c)*(Hc/Ht) \qquad \text{formula (1)}.$$

10 Claims, 4 Drawing Sheets

(51) Int. Cl.
- B29C 65/02 (2006.01)
- B29C 70/08 (2006.01)
- B29C 70/28 (2006.01)
- B29C 65/08 (2006.01)
- B29C 65/34 (2006.01)
- B29C 65/48 (2006.01)
- B29C 65/56 (2006.01)
- B29C 65/82 (2006.01)
- B29C 65/00 (2006.01)
- B29C 65/06 (2006.01)
- B29K 105/08 (2006.01)
- B29K 105/00 (2006.01)
- B29K 307/04 (2006.01)
- B29L 22/00 (2006.01)
- B29L 31/30 (2006.01)

(52) U.S. Cl.
CPC .......... B29C 66/7212 (2013.01); B29C 70/08 (2013.01); B29C 70/28 (2013.01); B29D 22/00 (2013.01); B29C 65/06 (2013.01); B29C 65/08 (2013.01); B29C 65/34 (2013.01); B29C 65/48 (2013.01); B29C 65/562 (2013.01); B29C 65/823 (2013.01); B29C 66/1312 (2013.01); B29C 66/71 (2013.01); B29C 66/721 (2013.01); B29C 66/73921 (2013.01); B29C 66/73941 (2013.01); B29K 2105/08 (2013.01); B29K 2105/25 (2013.01); B29K 2307/04 (2013.01); B29L 2022/00 (2013.01); B29L 2031/30 (2013.01); B29L 2031/3044 (2013.01)

(58) Field of Classification Search
USPC ........................................................ 428/36.4
See application file for complete search history.

(56) References Cited

U.S. PATENT DOCUMENTS

2013/0113237 A1    5/2013  Huhn
2013/0313863 A1   11/2013  Yamaji et al.

FOREIGN PATENT DOCUMENTS

| | | |
|---|---|---|
| JP | 2006-207330 A | 8/2006 |
| JP | 2007-261469 A | 10/2007 |
| JP | 2011-207330 A | 10/2011 |
| JP | 2012-125948 A | 7/2012 |
| WO | 2012-105717 A1 | 8/2012 |

HOLLOW STRUCTURE BODY AND VEHICULAR COMPONENT

CROSS REFERENCE TO RELATED APPLICATIONS

This is a U.S. National Phase Application under 35 U.S.C. §371 of International Application No. PCT/JP2015/057517, filed Mar. 13, 2015, which claims priority to Japanese Application No. 2014-054962 filed Mar. 18, 2014, the entire disclosures of which are incorporated herein by reference.

TECHNICAL FIELD

The present invention relates to a hollow structure body constituted by a fiber-reinforced resin material containing reinforcing fibers and a matrix resin. Specifically, the present invention relates to a hollow structure body having a desired strength by using minimum amount of the fiber-reinforced resin material.

BACKGROUND

In recent years, according to progress of development of an electric vehicle and the like, vehicle structures have been desired to achieve further weight reduction in order to improve fuel consumption, and use of resin materials, instead of metallic materials represented by conventional iron material, has been studied. In particular, a fiber-reinforced resin material has been studied to use various fields, as an alternative material of metallic materials, due to light weight and excellent strength thereof.

When a bending load-carrying member such as a side face frame structure of vehicle skeleton is manufactured by using the fiber-reinforced resin material, a hollow structure is generally adopted in order to achieving both desired performance index (for example, strength, rigidity, energy absorption property, and the like) and weight reduction. For example, Patent Document 1 discloses an energy absorption vehicular component having a hollow structure and obtained by using a fiber-reinforced resin material. Such a conventional hollow structure body generally has the same thickness or shape of each shaped product.

CITATION LIST

Patent Document

[Patent Document 1] JP-A-2006-27433

SUMMARY OF INVENTION

Problems that Invention is to Solve

As described above, since a fiber-reinforced resin material has both light weight and excellent strength, the fiber-reinforced resin material has been studied as an alternative material of metallic materials. The fiber-reinforced resin material possesses particular properties, which metallic materials do not possess. Specifically, while the fiber-reinforced resin material possesses excellent tensile strength, compressive strength thereof is relatively low. That is, the fiber-reinforced resin material possesses a property that compressive strength is significantly different from tensile strength.

Owing to such a property of the fiber-reinforced resin material, there has been a problem that in a conventional hollow structure body as described above, a property of light weight and excellent strength of the fiber-reinforced resin material is not sufficiently exerted. For example, in a hollow structure body obtained by combining two shaped products with the same thickness and shape, constituted by a fiber-reinforced resin material, when a compression external force is applied to the hollow structure body from an arbitrary direction, a compressive stress is applied to a shaped product arranged at a side where compressive force is received, and a tensile stress is applied to the other shaped product. In this case, compressive strength of the shaped product arranged at the side where compressive force is received tends to be lower than tensile strength of the other shaped product due to the above mentioned property of the fiber-reinforced resin material. Further, since a whole strength of the hollow structure body is determined by the compressive strength of the shaped product arranged at the side where compressive force is received, there has been a problem that excellent tensile strength of the fiber-reinforced resin material cannot be sufficiently exerted. In addition to this, in the hollow structure body obtained by combining two shaped products with the same thickness and shape, constituted by a fiber-reinforced resin material, a thickness of the shaped product arranged at a side where tensile stress is received is excessive due to the above mentioned property of the fiber-reinforced resin material. For this reason, there has been a problem that sufficient weight reduction cannot be made.

The present invention is made in view of these problems and has a main purpose to provide a hollow structure body capable to achieving weight reduction and excellent strength, constituted by a fiber-reinforced resin material.

Means for Solving the Problems

In order to solve the above problems, the present invention provides a hollow structure body having a hollow structure in which a first shaped product constituted by a first fiber-reinforced resin material containing first reinforcing fibers and a first matrix resin is combined with a second shaped product constituted by a second fiber-reinforced resin material containing second reinforcing fibers and a second matrix resin, characterized in that in an arbitrary cross section perpendicular to an axial direction of the hollow structure, a ratio Sc/St of compressive strength Sc of the structure in the first shaped product to tensile strength St of the structure in the second shaped product satisfies the following formula (1).

$$(\sigma c/\sigma t)*(Hc/Ht) < (Sc/St) < (\sigma t/\sigma c)*(Hc/Ht) \qquad \text{formula (1)}$$

Here, symbols in the formula (1) are as follows.

Hc: Height of the first shaped product
Ht: Height of the second shaped product
σc: Compressive strength of the first fiber-reinforced resin material in the axial direction
σt: Tensile strength of the second fiber-reinforced resin material in the axial direction
Ac: Cross section area of the first shaped product in the above cross section
At: Cross section area of the second shaped product in the above cross section
Sc: σc*Ac, compressive strength of the structure in the first shaped product
St: σt*At, compressive strength of the structure in the second shaped product In the present invention, when Hc, the height of the first shaped product, and Ht, the height of the second shaped product, are the same, it is preferable that the cross section satisfying the formula (1) satisfies the following formula (2).

$$(\sigma c/\sigma t) < (Tc^*\sigma c)/(Tt^*\sigma t) < (\sigma t/\sigma c) \quad \text{formula (2)}$$

Here, symbols in the formula (2) are as follows.
Tc: Average thickness of the above cross section of the first shaped product
Tt: Average thickness of the above cross section of the second shaped product In the hollow structure body of the present invention, the first reinforcing fibers and the second reinforcing fibers are preferably two-dimensionally randomly oriented. In this case, the ratio Sc/St preferably satisfies $1.04^*(\sigma c/\sigma t)^*(Hc/Ht) \le (Sc/St) \le 0.96^*(\sigma t/\sigma c)^*(Hc/Ht)$.

Further, in the hollow structure body of the present invention, a fiber volume content rate Vfc of the first reinforcing fibers in the first fiber-reinforced resin material and a fiber volume content rate Vft of the second reinforcing fibers in the second fiber-reinforced resin material preferably meet Vfc>Vft, an average fiber length Lc of the first reinforcing fibers and an average fiber length Lt of the second reinforcing fibers preferably meet Lc>Lt, and an average fiber diameter Dc of the first reinforcing fibers and an average fiber diameter Dt of the second reinforcing fibers preferably meet Dc<Dt.

Also, the present invention provides vehicular components characterized by using the hollow structure body of the present invention.

Advantage of Invention

The hollow structure body of the present invention shows effects of both strength and weight reduction by obtaining a desired strength by using minimum amount of a fiber-reinforced resin material.

DESCRIPTION OF EMBODIMENTS

Hereinafter, a hollow structure body and vehicular components of the present invention will be explained.

Hollow Structure Body

Initially, a hollow structure body of the present invention will be explained. As described above, the hollow structure body of the present invention having a hollow structure in which a first shaped product constituted by a first fiber-reinforced resin material containing first reinforcing fibers and a first matrix resin is combined with a second shaped product constituted by a second fiber-reinforced resin material containing second reinforcing fibers and a second matrix resin, characterized in that in an arbitrary cross section perpendicular to an axial direction of the hollow structure, a ratio Sc/St of compressive strength Sc of the structure in the first shaped product to tensile strength St of the structure in the second shaped product satisfies the above formula (1).

Figure 1:
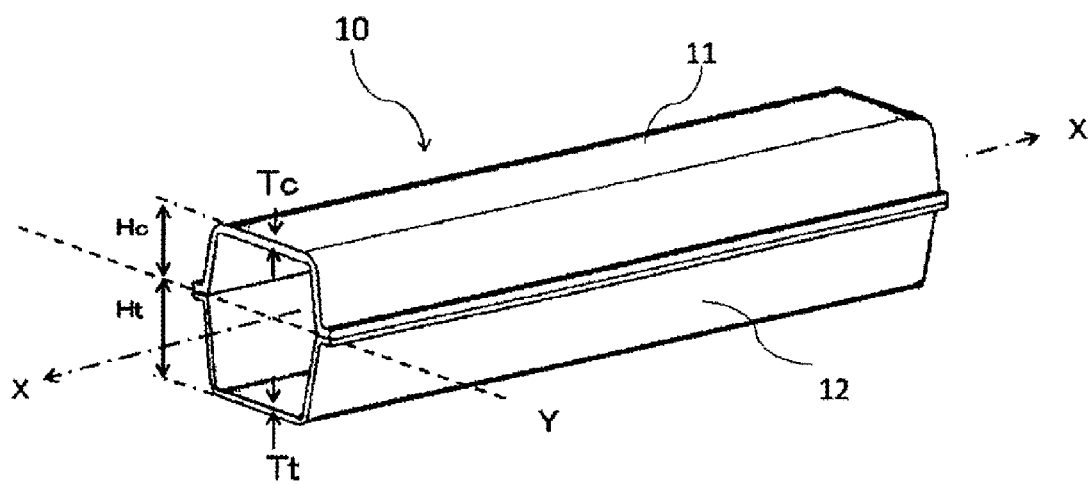
FIG. 1 is a schematic view showing one example of a hollow structure body of the present invention.

Such a hollow structure body of the present invention will be explained in reference to figures. FIG. 1 is a schematic view showing one example of a hollow structure body of the present invention. As exemplified in FIG. 1, a hollow structure body 10 of the present invention has a hollow structure formed by combining a first shaped product 11 and a second shaped product 12. Here, the first shaped product 11 is constituted by the first fiber-reinforced resin material containing the first reinforcing fibers and the first matrix resin, and the second shaped product is constituted by the second fiber-reinforced resin material containing the second reinforcing fibers and the second matrix resin.

Also, as exemplified in FIG. 1, a cross section perpendicular to an axial direction X of the hollow structure in the hollow structure body 10 of the present invention is a closed section by combining the first shaped product 11 and the second shaped product 12. Further, the hollow structure body 10 of the present invention is characterized in that a ratio Sc/St of compressive strength Sc of the structure in the first shaped product 11 to tensile strength St of the structure in the second shaped product 12 satisfies the above formula (1).

In FIG. 1, Y represents an interface between the first shaped product 11 and the second shaped product 12. Also, in FIG. 1, Tc and Tt represent thicknesses of the first shaped product 11 and the second shaped product 12, respectively, and Hc and Ht represent heights of the first shaped product 11 and the second shaped product 12, respectively.

An "axial direction of the hollow structure" in the present invention means a center line direction of a hollow portion of the hollow structure body, as shown in FIG. 1 as X.

FIG. 1 shows an embodiment where a shape of the cross section is uniform in the axial direction of the hollow structure, as one example of the hollow structure body of the present invention, but the hollow structure body of the present invention is, of course, not limited to such an example. The hollow structure body of the present invention also includes an embodiment where a shape of the cross section is varied in the axial direction of the hollow structure. In the case of the embodiment where a shape of the cross section is varied in the axial direction of the hollow structure, the ratio Sc/St does not require that all cross sections meet the formula (1), but require that an arbitrary cross section meets the formula (1).

The formula (1) includes a height Hc of the first shaped product and a height Ht of the second shaped product. These represent the longest distances in a direction perpendicular to the interface between the first shaped product and the second shaped product among distances from the interface to the first shaped product and the second shaped product, respectively. When these are explained by using FIG. 1, in the hollow structure body 10 of the present invention, the height Hc of the first shaped product 11 and the height Ht of the second shaped product 12 are distances represented as Ht and Hc in FIG. 1, respectively, of which the interface Y between the first shaped product 11 and the second shaped product 12 is a reference plane.

The hollow structure body of the present invention can suppress, by that the ratio Sc/St of compressive strength Sc of the structure in the first shaped product to tensile strength St of the structure in the second shaped product satisfies the formula (1), the first shaped product from being broken before breakage of the second shaped product when an external force is applied to the hollow structure body of the present invention at a first shaped product side.

Also, the hollow structure body of the present invention can suppress, by satisfying the formula (1), the fiber-reinforced resin material from being excessively used in order to achieve a desired strength, and can achieve the desired strength of whole hollow structure body by using minimum amount of the fiber-reinforced resin material.

Thus, the hollow structure body of the present invention shows effects of both strength and weight reduction by achieving a desired strength by using minimum amount of the fiber-reinforced resin material.

In the hollow structure body of the present invention, a neutral plane is located close to the interface between the first shaped product and the second shaped product by satisfying the formula (1).

As described above, the hollow structure body of the present invention can suppress, by satisfying the formula (1), the first shaped product from being firstly broken when an external force is applied to the hollow structure body of the present invention at the first shaped product side. That is, the hollow structure body of the present invention shows excellent strength when used in application where compressive stress is applied at the first shaped product side.

The hollow structure body of the present invention is characterized in that the ratio Sc/St satisfies the formula (1). Here, the formula (1) is obtained from the following formula (3).

$$(Sc/St)=k(Hc/Ht) \quad \text{formula (3)}$$

The formula (3) is introduced based on the following concept. When, a ratio (Sc/St) of compressive strength of the structure of the first shaped product constituting the hollow structure body of the present invention to tensile strength of the structure of the second shaped product constituting the hollow structure body of the present invention satisfies the formula (3), as a shape parameter (Hc/Ht) of the shaped products, both of compressive strength of the structure of the first shaped product constituting the hollow structure body of the present invention and tensile strength of the structure of the second shaped product constituting the hollow structure body of the present invention can be utilized to show development of structure strength. The hollow structure body of the fiber-reinforced resin material thus designed and manufactured satisfies a desired strength and further achieves weight reduction effect, which is preferable.

Here, k in the formula (3) represents a coefficient and is ideally 1. Also, when k is within a range shown in the following formula (4), weight reduction effect can be obtained.

$$(\sigma c/\sigma t)<k<(\sigma t/\sigma c) \quad \text{formula (4)}$$

Thus, the formula (1) is obtained by substituting the formula (4) into the formula (3).

When the interface between the first shaped product and the second shaped product is not consistent with the neutral plane of the hollow structure body, the formula (3) should be defined, strictly speaking, as the followings $$(Sc/St)=k((Hc+E)/(Ht-E)) \quad \text{formula (3')}$$

Here, E represents a distance from the interface between the first shaped product and the second shaped product to the neutral plane of the hollow structure body. In the formula (3), E is omitted considering that E is often so small as to be ignorable. In the formula (3'), E becomes "+" when the neutral plane is located at a second shaped product side (tensile side) than the interface between the first shaped product and the second shaped product and becomes "−" when the neutral plane is located at a first shaped product side (compression side).

The hollow structure body of the present invention is characterized in that in an arbitrary cross section in a direction perpendicular to the axial direction of the hollow structure, the ratio Sc/St is within the range to satisfy the formula (1). In the present invention, the reason for defining that the ratio Sc/St is within the range of the formula (1) will be explained. When the ratio Sc/St is out of the formula (1), a balance between compressive strength of the structure of the first shaped product and tensile strength of the structure of the second shaped product, in the hollow structure body, is extremely deteriorated. For this reason, when compressive stress is applied at the first shaped product side, there is always a concern that at least one of the first shaped product and the second shaped product tends to be broken firstly. For example, when satisfying $(Sc/St) \leq (\sigma c/\sigma t)*(Hc/Ht)$, the first shaped product tends to be broken firstly, and when satisfying $(Sc/St) \geq (\sigma t/\sigma c)*(Hc/Ht)$, the second shaped product tends to be broken firstly.

A fact where a balance between compressive strength of the structure of the first shaped product and tensile strength of the structure of the second shaped product is bad and strength of either one is excessive has the same meanings that a weight of a shaped product of which strength is excessive is excessive, when assuming materials of the first shaped product and the second shaped product are the same. That is, a fact where the ratio Sc/St is out of the range of the formula (1) has the same meanings that a fiber-reinforced resin material is excessively used to obtain a desired strength in the hollow structure body, and sufficient weight reduction effect cannot be obtained.

The ratio Sc/St in the present invention is not particularly limited as long as the ratio satisfies the range of the formula (1). However, $1.04*(\sigma c/\sigma t)*(Hc/Ht) \leq (Sc/St) \leq 0.96*(\sigma t/\sigma c)*(Hc/Ht)$ is more preferable. In particular, when the first reinforcing fibers and the second reinforcing fibers are two-dimensionally randomly oriented as described later in the present invention, the ratio Sc/St is preferably within $1.04*(\sigma c/\sigma t)*(Hc/Ht) \leq (Sc/St) \leq 0.96*(\sigma t/\sigma c)*(Hc/Ht)$. By that the ratio Sc/St is within such a range, whole hollow structure body can achieve a desired strength while being further light weight.

When in the present invention, a material having compressive strength of around 250 MPa as the first fiber-reinforced resin material and a material having tensile strength of around 350 MPa as the second fiber-reinforced resin material are used, the ratio Sc/St is preferably within $0.74*(Hc/Ht) \leq (Sc/St) \leq 1.34*(Hc/Ht)$. By that the ratio Sc/St is within such a range, when the first fiber-reinforced resin material and the second fiber-reinforced resin material are used, whole hollow structure body can achieve a desired strength while being further light weight.

The hollow structure body of the present invention is characterized in that in an arbitrary cross section in a direction perpendicular to the axial direction of the hollow structure, the ratio Sc/St satisfies the formula (1). Therefore, the hollow structure body of the present invention may have a cross section not satisfying the formula (1) as long as even one cross section satisfying the formula (1) is present. In the hollow structure body of the present invention, an existence ratio of the cross section satisfying the formula (1) can be appropriately determined, depending on use of the hollow structure body of the present invention, and is not particularly limited. However, as described above, the hollow structure body of the present invention is suitable for use in which compressive load is applied to the first shaped product, and therefore it is preferable that cross sections in a region to which compressive load is applied satisfy the formula (1). In order to sufficiently achieve excellent strength and weight reduction, which is a purpose of the present invention, it is the most preferable that cross sections in the whole region of the axial direction in the hollow structure satisfy the formula (1).

First Shaped Product and Second Shaped Product

The first shaped product and the second shaped product used in the present invention forms a hollow structure by combining them. Hereinafter, the first shaped product and the second shaped product will be explained. The first fiber-reinforced resin material and the second fiber-reinforced resin material constituting the first shaped product and the second shaped product, respectively, will be described later.

The first shaped product and the second shaped product used in the present invention are not particularly limited as long as they have a shape capable of forming a hollow structure by combining them. Among them, when the height Hc of the first shaped product and the height Ht of the second shaped product are the same in the present invention, the cross section satisfying the formula (1) preferably satisfies the following formula (2).

$$(\sigma c/\sigma t) < (Tc^*\sigma c)/(Tt^*\sigma t) < (\sigma t/\sigma c) \quad \text{formula (2)}$$

Only by adjusting an average thickness Tc of the first shaped product and an average thickness Tt of the second shaped product, a desired structure strength can be obtained while achieving weight reduction.

Meanwhile, in the formula (2), Tc and Tt represent average thicknesses at the cross section satisfying the formula (2) of the first shaped product and the second shaped product, respectively.

When the ratio $(Tc^*\sigma c)/(Tt^*\sigma t)$ is within the range of the formula (2) in the present invention, $1.04^*(\sigma c/\sigma t) \leq (Tc^*\sigma c)/(Tt^*\sigma t) \leq 0.96^*(\sigma t/\sigma c)$ is more preferable, and $(Tc^*\sigma c)/(Tt^*\sigma t)=1$ is further preferable. By that the ratio $(Tc^*\sigma c)/(Tt^*\sigma t)$ is within such a range, the hollow structure body can achieve a desired strength while being further light weight.

When in the present invention, a material having compressive strength of around 250 MPa as the first fiber-reinforced resin material and a material having tensile strength of around 350 MPa as the second fiber-reinforced resin material are used, $0.74 \leq (Tc^*\sigma c)/(Tt^*\sigma t) \leq 1.34$ is preferable, and $(Tc^*\sigma c)/(Tt^*\sigma t)=1$ is more preferable. By that the ratio $(Tc^*\sigma c)/(Tt^*\sigma t)$ is within such a range, when the first fiber-reinforced resin material and the second fiber-reinforced resin material are used, the hollow structure body can achieve a desired strength while being further light weight.

A shape of the first shaped product and the second shaped product used in the present invention is not particularly limited as long as a hollow structure can be formed by combining them and they have a shape satisfying the formula (1). That is, each shape of the first shaped product and the second shaped product can be appropriately determined, depending on use of the hollow structure body of the present invention, a composition of the first fiber-reinforced resin material and the second fiber-reinforced resin material or the like. Among them, a shape having an opened section is preferable. By this, a hollow structure can be easily formed by combining the first shaped product and the second shaped product in a manner where opened sides of both opened sections included therein, respectively, are faced to each other.

An embodiment where a shape of the first shaped product and the second shaped product used in the present invention is not particularly limited as long as a hollow structure can be formed by combining the first shaped product and the second shaped product and the formula (1) is satisfied. As such embodiments, for example, a shape of the first shaped product and the second shaped product is a hat shape including a bottom plane part, a top plane part, and a standing plane part connecting to the bottom plane part and the top plane part, a shape having a semicircular concave portion, and the like, are exemplified. Any shape among the above can be suitably adopted as a shape of the first shaped product and the second shaped product, and depending on use of the hollow structure body of the present invention, a suitable shape can be appropriately selected. Also, in the present invention, a shape of the first shaped product may be the same as or different from a shape of the second shaped product.

In the present invention, it is preferable that both of the first shaped product and the second shaped product have the hat shape. By using a shaped product having the hat shape as the first shaped product and the second shaped product, it is possible to improve moment of inertia of area of the hollow structure body of the present invention. Thus it is possible to effectively utilize a material.

Figure 2:
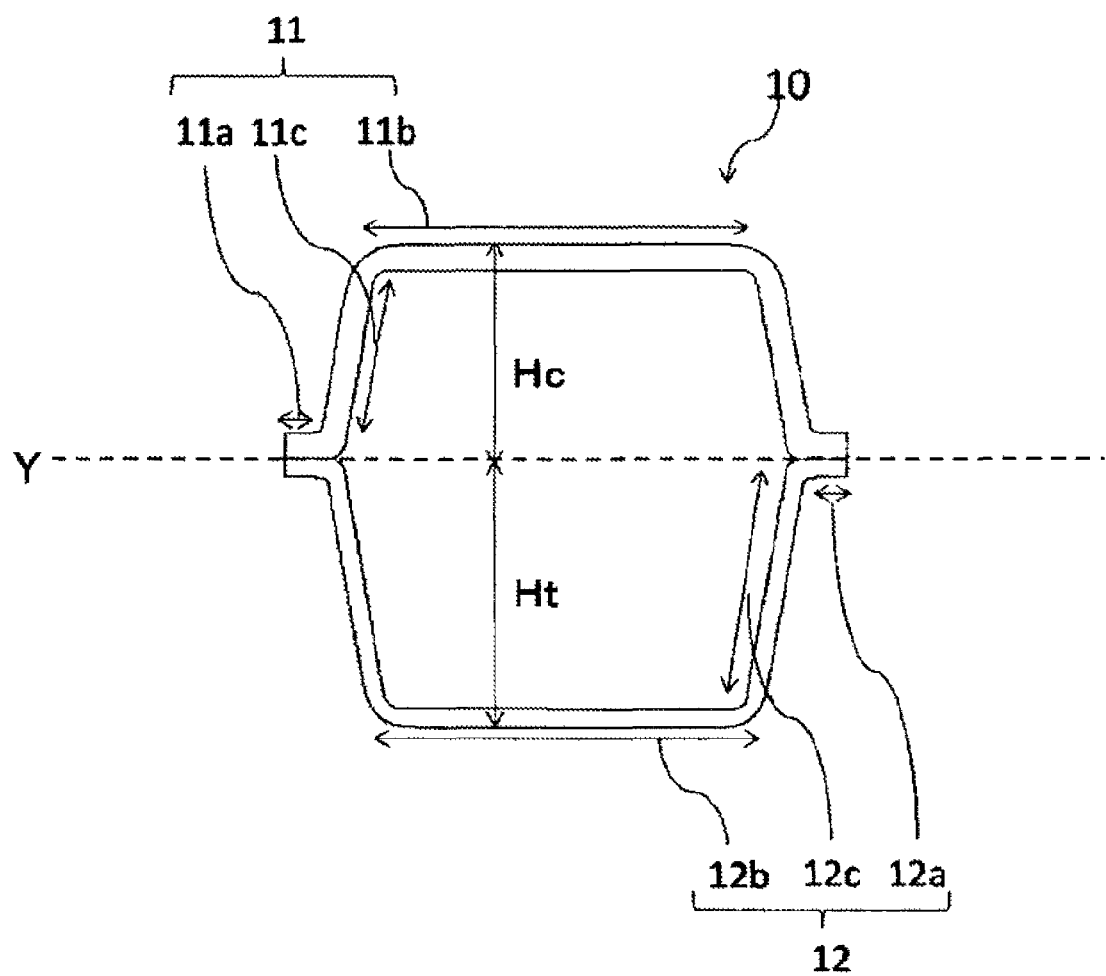
FIG. 2 is a schematic view showing another example of a hollow structure body of the present invention.

An embodiment where both of the first shaped product and the second shaped product have the hat shape will be explained in reference to the figure. FIG. 2 is a schematic view showing one example of the embodiment where both of the first shaped product and the second shaped product have the hat shape. As shown in FIG. 2, the hollow structure body 10 of the present invention preferably has a hat shape in which the first shaped product 11 and the second shaped product 12 have a bottom plane part 11a, a top plane part 11b and a standing plane part lie, and a bottom plane part 12a, a top plane part 12b and a standing plane 12c, respectively. In this case, the hollow structure body 10 of the present invention has a hollow structure formed by combining the bottom plane part 11a of the first shaped product 11 and the bottom plane part 12a of the second shaped product 12 to be in contact with each other. Also, a height Hc of the first shaped product 11 and a height Ht of the second shaped product 12 are distances from the interface Y between the first shaped product and the second shaped product shown in FIG. 2, respectively.

In a case where both of the first shaped product and the second shaped product have the hat shape, a relationship between of the height Hc of the first shaped product 1 and the height Ht of the second shaped product is preferably Ht≥Hc. By this, the hollow structure body of the present invention easily satisfies the formula (1). As a result, sufficient high strength and weight reduction are easily achieved regardless of application of the hollow structure body of the present invention.

First Fiber-Reinforced Resin Material and Second Fiber-Reinforced Resin Material Consequently, the first fiber-reinforced resin material and the second fiber-reinforced resin material used in the present invention will be explained. The first fiber-reinforced resin material used in the present invention contains the first reinforcing fibers and the first matrix resin, and the second fiber-reinforced resin material used in the present invention contains the second reinforcing fibers and the second matrix resin.

Hereinafter, the first fiber-reinforced resin material and the second fiber-reinforced resin material used in the present invention will be explained, respectively.

In the following explanation, the first fiber-reinforced resin material and the second fiber-reinforced resin material are called "fiber-reinforced resin material" in some cases, the first reinforcing fibers and the second reinforcing fibers are called "reinforcing fibers" in some cases, and the first matrix resin and the second matrix resin are called "matrix resin" in some cases.

(1) Reinforcing Fiber

The reinforcing fibers used in the present invention are not particularly limited as long as compressive strength and tensile strength of a fiber-reinforced resin material can be set within a desired range, and the formula (1) is satisfied. Thus, as the reinforcing fibers of the present invention, both of inorganic fibers and organic fibers are suitably available.

As the inorganic fiber, for example, a carbon fiber, an activated carbon fiber, a graphite fiber, a glass fiber, a tungsten carbide fiber, a silicon carbide fiber, a ceramic fiber, an alumina fiber, a natural fiber, a mineral fiber such as basalt, a boron fiber, a boron nitride fiber, a boron carbide fiber, a metal fiber, and the like are exemplified. As the metal fiber, for example, an aluminum fiber, a copper fiber, a brass fiber, a stainless steel fiber, a steel fiber, and the like are exemplified. As the glass fiber, a glass fiber formed of E glass, C glass, S glass, D glass, T glass, a quartz glass fiber, a borosilicate glass fiber, and the like are exemplified.

As the organic fiber, for example, a fiber formed of a resin material such as polybenzazole such as polyparaphenylene bezoxazole (PBO), aramid, polyphenylene sulfide, polyester, acryl, polyamide, polyolefin, polyvinyl alcohol, polyarylate, and the like are exemplified.

In the present invention, one type of reinforcing fibers may be used, and two or more types of reinforcing fibers may be used in combination. In this case, a plurality of types of the inorganic fiber may be used in combination, a plurality of types of the organic fiber may be used in combination, or the inorganic fiber and the organic fiber may be used in combination. As an aspect of using the plurality of types of the inorganic fiber in combination, for example, an aspect of using a carbon fiber and a metal fiber in combination, an aspect of using a carbon fiber and a glass fiber in combination, and the like are exemplified. On the other hand, as an aspect of using the plurality of types of the organic fiber in combination, for example, an aspect of using an aramid fiber and a fiber formed of other organic materials in combination, and the like are exemplified. Further, as an aspect of using the inorganic fiber and the organic fiber in combination, for example, an aspect of using a carbon fiber and an aramid fiber in combination is exemplified.

In the present invention, it is preferable that carbon fibers are used as the reinforcing fibers. As the carbon fiber, in general, a polyacrylonitrile (PAN)-based carbon fiber, a petroleum oil and coal pitch-based carbon fiber, a rayon-based carbon fiber, a cellulose-based carbon fiber, a lignin-based carbon fiber, a phenol-based carbon fiber, a vapor phase growth-based carbon fiber, and the like are known, and in the present invention, any carbon fiber may be preferably used.

The reinforcing fibers used in the present invention may be ones to which a sizing agent is adhered at a surface thereof. In a case where the reinforcing fibers to which a sizing agent is adhered, kinds of the sizing agent can be appropriately selected depending on kinds of the reinforcing fibers and the matrix resin, and are not particularly limited.

An average fiber length of the reinforcing fibers used in the present invention is not particularly limited, and is preferably within a range of 1 mm to 100 mm, more preferably a range of 5 mm to 75 mm, and further preferably a range of 10 mm and 50 mm.

An average fiber length in the present invention may be a number average fiber length or a weight average fiber length, but is preferably measured by a weight average fiber length emphasizing fibers with a long fiber length. Here, when a fiber length of individual carbon fibers is Li and the number of measured fibers is j, the number average fiber length (Ln) and the weight average fiber number (Lw) are obtained by the following formulae (a) and (b).

$$Ln = \Sigma Li/j \qquad \text{formula (a)}$$

$$Lw = (\Sigma Li^2)/(\Sigma Li) \qquad \text{formula (b)}$$

As a case where reinforcing fibers are cut with a rotary cutter, when a fiber length is a fixed length, the number average fiber length is the same as the weight average fiber length.

When an average fiber length of the reinforcing fibers have a plurality of peak values, it is preferable at least one of the peak values is within the above described range.

An average fiber length Lc of the first reinforcing fibers used in the present invention and an average fiber length Lt of the second reinforcing fibers may be the same or different. When they are different, a size relationship thereof is not particularly limited, but it is preferable that Lc>Lt is satisfied in the present invention. By satisfying Lc>Lt, it is possible to adjust compressive strength of the first fiber-reinforced resin material to be higher and to adjust tensile strength of the second fiber-reinforced resin material to be lower. As a result, it is possible to make a different between the compressive strength of the first fiber-reinforced resin material and the tensile strength of the second fiber-reinforced resin material smaller. By this, the compressive strength of the structure in the first shaped product and the tensile strength of the structure in the second shaped product are facilitated to be balanced, and therefore it is possible to make the hollow structure body of the present invention be lighter weight and excellent structure strength.

An average diameter of the reinforcing fibers used in the present invention may be appropriately selected depending on kinds of the reinforcing fibers and the like, and is not particularly limited. For example, when carbon fibers are used as the reinforcing fibers, an average fiber diameter is preferably within a range of 3 μm to 50 μm, more preferably a range of 4 μm to 12 μm, and further preferably a range of 5 μm to 8 μm. Also, when glass fibers are used as the reinforcing fibers, an average fiber diameter is preferably within a range of 3 μm to 30 μm. Here, the average fiber diameter indicates a diameter of single fibers of the reinforcing fibers. That is, when the reinforcing fibers are in a bundle state, it does not indicate a diameter of a fiber bundle but a diameter of reinforcing fibers (single fibers) constituting a fiber bundle. The average fiber diameter of the reinforcing fibers can be measured, for example, in a manner described in JIS R7607:2000. Meanwhile, the content of JIS R7607:2000 is incorporated herein by reference.

An average fiber diameter Dc of the first reinforcing fibers used in the present invention and an average fiber diameter Dt of the second reinforcing fibers used in the present invention may be the same or different. When they are different, a size relationship thereof is not particularly limited, but it is preferable that Dc<Dt is satisfied in the present invention. It is generally known that as a fiber diameter of reinforcing fibers is thick, strength of a fiber-reinforced resin material is lowered. By satisfying Dc<Dt, it is possible to adjust compressive strength of the first fiber-reinforced resin material to be larger and to adjust tensile strength of the second fiber-reinforced resin material to be smaller. As a result, it is possible to make a different between the compressive strength of the first fiber-reinforced resin material and the tensile strength of the second fiber-reinforced resin material smaller. By this, the compressive strength of the structure in the first shaped product and the tensile strength of the structure in the second shaped product are facilitated to be balanced, and therefore it is possible to make the hollow structure body of the present invention be lighter weight and excellent structure strength.

The reinforcing fibers used in the present invention may be, regardless of kinds of thereof, in a single fiber state constituted by single fibers or in a fiber bundle state constituted by a plurality of single fibers. The reinforcing fibers used in the present invention may include single fibers only, fiber bundles only, or a mixture thereof. When using ones in a fiber bundle state, the number of single fibers constituting each fiber bundle may be almost uniform in the each fiber bundle or be different. When the reinforcing fibers used in the present invention are in a fiber bundle state, the number of single fibers constituting each reinforcing fibers is not particularly limited, but is generally within a range of 1,000 to 100,000.

In general, carbon fibers are in a fiber bundle state where thousands of or tens of thousands of filaments (single fibers) are collected. In a case where carbon fibers are used as reinforcing fibers, when the carbon fibers are used as they are, entangled portions of fiber bundles locally become thick, and thereby it becomes possible to obtain a thin fiber-reinforced material in some cases. Thus, when using carbon fibers as reinforcing fibers, fiber bundles are generally widened or opened.

When using carbon fibers which are opened, a degrees of opening of the carbon fibers which are opened is not particularly limited, but it is preferable that by controlling the degree of opening, carbon fiber bundles constituted by carbon fibers of a specific number or more and carbon fibers (single fibers) or carbon fiber bundles which are constituted by carbon fibers of less than the specific number are included. In this case, it is preferable that carbon fiber bundles (A) constituted by reinforcing fibers of a critical number of single fiber or more, the critical number defined by the following formula (i), and the other opened carbon fibers, that is being in a single fiber state or fiber bundles constituted by reinforcing fibers of less than the critical number of single fiber, are included.

$$\text{Critical number of single fiber} = 600/D \quad \text{(i)}$$

Here, D represents an average fiber diameter D (μm) of carbon single fibers.

In the present invention, a ratio of the carbon fiber bundle (A) to the total amount of the carbon fibers contained in the fiber-reinforced resin material is preferably more than 0 Vol % and less than 99 Vol %, more preferably 20 Vol % or more and less than 99 Vol %, further preferably 30 Vol % or more and less than 95 Vol %, most preferably 50 Vol % or more and less than 90 Vol %. Thus, by existing the carbon fiber bundles constituted by carbon fibers of the specific number or more and the other opened carbon fibers or carbon fiber bundles in a specific ratio, an amount of carbon fibers contained in the fiber-reinforced resin material, that is, fiber volume content rate (Vf), can be heightened.

A degree of carbon fibers can be set to a desired range by adjusting opening condition of fiber bundles. For example, when fiber bundles are opened by spraying air, a degree of carbon fibers can be adjusted by controlling a pressure or the like of the air which is sprayed to the fiber bundles. In this case, heightening a pressure of air tends to lead to a high opening degree (the number of single fibers constituting each fiber bundle is small), and lowering a pressure of air tends to lead to a low opening degree (the number of single fibers constituting each fiber bundle is large).

When carbon fibers are used as reinforcing fibers in the present invention, an average fiber number (N) of the carbon fiber bundle (A) can be appropriately determined within a range in which a purpose of the present invention is not impaired, and is not particularly limited. In a case of carbon fibers, the N is generally within a range of 1<N<12,000, and it is more preferably that the following formula (ii) is satisfied.

$$0.6*10^4/D^2 < N < 1*10^5/D^2 \quad \text{(ii)}$$

Here, D represents an average fiber diameter D (μm) of carbon single fibers.

(2) Matrix Resin

Next, a matrix resin used in the present invention will be explained. The matrix resin used in the present invention is not particularly limited as long as a fiber-reinforced resin material satisfying the formula (1) can be obtained, and can be appropriately selected for use depending on kinds of reinforcing fibers or the like. Thus, the matrix resin of the present invention may be a thermoplastic resin or a thermosetting resin.

(Thermoplastic Resin)

As the thermoplastic resin used in the present invention, for example, a polyolefin resin, a polystyrene resin, a thermoplastic polyamide resin, a polyester resin, a polyacetal resin (a polyoxy methylene resin), a polycarbonate resin, a (meth)acryl resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluorine-based resin, a thermoplastic polybenzimidazole resin, and the like are exemplified.

As the polyolefin resin described above, for example, a polyethylene resin, a polypropylene resin, a polybutadiene resin, a polymethyl pentene resin, a vinyl chloride resin, a vinylidene chloride resin, a vinyl acetate resin, a polyvinyl alcohol resin, and the like are exemplified.

As the polystyrene resin described above, for example, a polystyrene resin, an acrylonitrile-styrene resin (an AS resin), an acrylonitrile-butadiene-styrene resin (an ABS resin), and the like are exemplified. As the polyamide resin described above, for example, a polyamide 6 resin (Nylon 6), a polyamide 11 resin (Nylon 11), a polyamide 12 resin (Nylon 12), a polyamide 46 resin (Nylon 46), a polyamide 66 resin (Nylon 66), a polyamide 610 resin (Nylon 610), and the like are exemplified. As the polyester resin described above, for example, a polyethylene terephthalate resin, a polyethylene naphthalate resin, a polybutylene terephthalate resin, a polytrimethylene terephthalate resin, liquid crystal polyester, and the like are exemplified. As the (meth)acryl resin described above, for example, polymethyl methacrylate is exemplified. As the modified polyphenylene ether resin described above, for example, modified polyphenylene ether, and the like are exemplified. As the thermoplastic polyimide resin described above, for example, thermoplastic polyimide, a polyamide imide resin, a polyether imide resin, and the like are exemplified. As the polysulfone resin described above, for example, a modified polysulfone resin, a polyether sulfone resin, and the like are exemplified. As the polyether ketone resin described above, for example, a polyether ketone resin, a polyether ether ketone resin, and a polyether ketone ketone resin are exemplified. As the fluorine-based resin described above, for example, polytetrafluoroethylene, and the like are exemplified.

Only one type of the thermoplastic resin used in the present invention may be used, or two or more types thereof may be used. That is, in the both of the first fiber-reinforced resin material and the second fiber-reinforced resin material, only one type of the thermoplastic resin may be used, or two or more types thereof may be used. As an embodiment of using two or more types of the thermoplastic resin in combination, for example, an embodiment of using thermoplastic resins of which softening points or melting points are different from each other in combination, an embodiment of using thermoplastic resins of which average molecular weights are different from each other in combination, and the like are able to be included, but the embodiment is not limited thereto.

(Thermosetting Resin)

As the thermosetting resin used in the present invention, for example, cured materials of an epoxy resin, a vinyl ester resin, an unsaturated polyester resin, a diallyl phthalate resin, a phenol resin, a maleimide resin, a cyanate resin, a benzoxazine resin, a dicyclopentadiene resin, and the like, and modified materials thereof are exemplified. The epoxy resin is not particularly limited as long as a resin having an epoxy group in a molecular, for example, a bisphenhol A epoxy resin, a bisphenol F epoxy resin, a phenol novolac epoxy resin, a cresol novolac epoxy resin, a bisphenol AD epoxy resin, a biphenyl epoxy resin, a naphthalene epoxy resin, an alicyclic epoxy resin, a glycidyl ester resin, a glycidyl amine based epoxy resin, a heterocyclic epoxy resin, a diaryl sulfo epoxy resin, a hydroquinone epoxy resin, a modified material thereof, and the like are exemplified. Meanwhile, as the case of the thermoplastic resin, the thermosetting resin used in the present invention may be only one type or two or more types thereof in the both of the first fiber-reinforced resin material and the second fiber-reinforced resin material.

(3) Fiber-Reinforced Resin Material

As described above, the fiber-reinforced resin material used in the present invention contains reinforcing fibers and a matrix resin. In the present invention, the thermoplastic resin is preferably used as the matrix resin. By using the thermoplastic resin as the matrix resin, there is an advantage that molding time can be shortened when the first shaped product and the second shaped product are manufactured by press-molding, and the like. Also, by using the thermoplastic resin as the matrix resin, the first shaped product and the second shaped product can be recycled or reused in some cases.

Compressive strength $\sigma c$ of the first fiber-reinforced resin material of the present invention is not particularly limited as long as the formula (1) is satisfied, but is preferably 150 MPa or more, more preferably 200 MPa or more, and further preferably 250 MPa or more. In order for compressive strength $\sigma c$ of the first fiber-reinforced resin material to be within the above range, for example, a method of adjusting a content rate or a fiber length of the first reinforcing fibers contained in the first fiber-reinforced resin material, a method of changing kinds of at least one of the first reinforcing fibers and the first matrix resin, or the like can be adopted. More specifically, by increasing the content ratio of the first reinforcing fibers, using the first reinforcing fibers having a long length, or using at least one of the first reinforcing fibers and the first matrix resin of which compressive strength is larger, compressive strength of the first fiber-reinforced resin material can be heightened.

Tensile strength $\sigma t$ of the second fiber-reinforced resin material of the present invention is not particularly limited as long as the formula (1) is satisfied, but a smaller difference from the compressive strength ac of the first fiber-reinforced resin material is preferable, and particularly preferably $\sigma t = \sigma c$.

In order for tensile strength $\sigma t$ of the second fiber-reinforced resin material to be within the above range, for example, a method of adjusting a content rate or a fiber length of the second reinforcing fibers contained in the second fiber-reinforced resin material, a method of changing kinds of at least one of the second reinforcing fibers and the second matrix resin, or the like can be adopted. More specifically, by increasing the content ratio of the second reinforcing fibers, using the second reinforcing fibers having a long fiber length, or using at least one of the second reinforcing fibers and the second matrix resin of which tensile strength is larger, tensile strength of the second fiber-reinforced resin material can be heightened. However, by decreasing the content ratio of the second reinforcing fibers, using the second reinforcing fibers having a short fiber length or a thick diameter, or using at least one of the second reinforcing fibers and the second matrix resin of which tensile strength is small, the tensile strength of the second fiber-reinforced resin material can become small to approach for compressive strength of the first fiber-reinforced resin material.

Compressive strength $\sigma c$ of the first fiber-reinforced resin material can be measured in a method described in JIS K7076:1991. Tensile strength $\sigma t$ of the second fiber-reinforced resin material can be measured in a method described in JIS K7164:2005. Meanwhile, the contents of JIS K7076: 1991 and JIS K7164:2005 are incorporated herein by reference.

As described above, the fiber-reinforced resin material of the present invention contains at least the reinforcing fibers and the matrix resin, but may contain various additives depending on necessity within a range in which a purpose of the present invention is not impaired. The various additives are not particularly limited as long as a desired function, property or the like can be imparted to the fiber-reinforced resin material. As the various additives used in the present invention, for example, a melt viscosity reducing agent, an antistatic agent, a pigment, a softening agent, a plasticizing agent, a surfactant, a conductive particle, a filler, a carbon black, a coupling agent, a foaming agent, a lubricant, a corrosion inhibitor, a nucleating agent, a crystallization accelerator, a release agent, a stabilizer, an UV absorption agent, a colorant, a coloring inhibitor, an antioxidant, a flame retardant, a flame retardant auxiliary, a dripping inhibitor, a lubricant, a fluorescent brightening agent, a luminous pigment, a fluorescent dye, a flowability modifier, an inorganic and organic antibacterial agent, an insecticide, a photocatalyst base antifouling agent, an infrared absorbent, a photochromic agent, and the like are exemplified.

The fiber-reinforced resin material used in the present invention may contain short fibers having a short fiber length as the various additives. As the short fibers, fibers same as the above described reinforcing fibers, except that an average fiber length (weigh average fiber length and number average fiber length) is lower than the above described reinforcing fibers, may be used. The short fibers have a short fiber length than the above described reinforcing fibers, fibers having an average fiber length (weight average fiber length and number average fiber length) of 1 mm or less are exemplified.

An content of the matrix resin in the fiber-reinforced resin material used in the present invention may be appropriately determined depending of kinds of the matrix resin or the reinforcing fibers, or the like, and is not particularly limited.

In general, the content is 3 parts by mass to 1,000 parts by mass with respect to 100 parts by mass of the reinforcing fibers.

Volume content rate (Vf) of the reinforcing fibers in the fiber-reinforced resin material used in the present invention is preferably 10 Vol % to 70 Vol %. When the volume content rate of the reinforcing fibers in the fiber-reinforced resin material is less than 10 Vol %, a desired compressive strength or tensile strength cannot be obtained, and thereby structure strength of the first shaped product, the second shaped product, and the hollow structure body are insufficient in some cases. Also, when exceeding 70 Vol %, flowability of the fiber-reinforced resin material is lowered, and thereby it is difficult to obtain a desired shape when molding in some cases. The volume content rate of the reinforcing fibers in the fiber-reinforced resin material is more preferably within a range of 20 Vol % to 60 Vol %, and further preferably within a range of 30 Vol % to 50 Vol %.

A volume content rate Vfc of the first reinforcing fibers in the first fiber-reinforced resin material and a volume content rate Vft of the second reinforcing fibers in the second fiber-reinforced resin material may be the same or different. When they are different, magnification relation thereof is not particularly limited, but it is preferable that Vfc>Vft is satisfied in the present invention. By satisfying Vfc>Vft, it is possible to adjust compressive strength of the first fiber-reinforced resin material to be larger and to adjust tensile strength of the second fiber-reinforced resin material to be smaller. Thus, a difference between compressive strength of the first fiber-reinforced resin material and tensile strength of the second fiber-reinforced resin material can be smaller. By this, compressive strength of the structure in the first shaped product and tensile strength of the structure in the second shaped product are facilitated to be balanced, and therefore the hollow structure body of the present invention can be made lighter weight and excellent structure strength.

Also, existing state of the reinforcing fibers in the fiber-reinforced resin material is not particularly limited. For example, the existing state may be a state where the reinforcing fibers are aligned in one direction, or a state where the reinforcing fibers are randomly oriented. In the present invention, from the viewpoint for uniformity of rigidity or strength in a shape of the hollow structure body, a state of a two-dimensional random orientation in which long axial directions of the reinforcing fibers are randomly oriented in in-plane directions of the fiber-reinforced resin material is preferable. Here, the two dimensional random orientation of the reinforcing fibers in the fiber-reinforced resin material may be confirmed, for example, by conducting a tensile test in an arbitrary direction of the fiber-reinforced resin material and a direction perpendicular to the arbitrary direction to measure tensile modulus thereof, and obtaining a ratio (Eδ) which is obtained by dividing the larger value of the measured tensile modulus to the lower value. When the ratio of tensile modulus is less than 2, it is evaluated as two-dimensional random orientation of carbon fibers, and when the ratio of tensile modulus is less than 1.3, it is evaluated as excellent two-dimensional random orientation.

(Manufacturing Method of Fiber-Reinforced Resin Material)

Next, a manufacturing method of the fiber-reinforced resin material used in the present invention will be explained. The fiber-reinforced resin material used in the present invention can be manufactured by using a generally known method. For example, when using a thermoplastic resin as the matrix resin, a method including (1) a cutting step of cutting reinforcing fibers, (2) a opening step of opening the cut reinforcing fibers, (3) mixing the opened reinforcing fibers and fibrous or particulate matrix resin, and then performing compression heating, is exemplified.

When using a thermosetting resin as the matrix resin, for example, a method of impregnating the thermoplastic resin into reinforcing fibers and performing integration by pressurizing it is exemplified.

Manufacturing Method of Hollow Structure Body

Next, a manufacturing method of the hollow structure body of the present invention will be explained. The hollow structure body of the present invention can be manufactured by forming the first shaped product and the second shaped product in advance and combining and joined them to form the hollow structure body.

A method of manufacturing the first shaped product and the second shaped product is as follows. When using a thermoplastic resin as the first matrix resin and the second matrix resin, for example, a method of heating the first fiber-reinforced resin material and the second fiber-reinforced resin material in advance to a temperature of a softening point of the thermoplastic resin constituting the first fiber-reinforced resin material and the second fiber-reinforced resin or more and performing cold-pressing in a mold with a temperature of less than the softening point may be adopted. Also, a hot pressing method of putting the first fiber-reinforced resin material and the second fiber-reinforced resin into a mold with a temperature of a softening temperature of the thermoplastic resin to press them, and cooling it down to a temperature of less than the softening temperature of the thermoplastic resin may be adopted.

On contrary, when using a thermoplastic resin as the first matrix resin and the second matrix resin, for example, a method of arranging the first fiber-reinforced resin material and the second fiber-reinforced resin material into a mold, heating them to cure and mold the thermosetting resin may be adopted.

Consequently, as a combining and joining method of the first shaped product and the second shaped product, a generally known method, for example, a welding method such as a vibration welding method, an ultrasonic welding method, an electric welding, an adhesive method in which an adhesive is used, or a mechanical fastening method in which bolts and nuts are used, may be used.

Application of Hollow Structure Body

As described above, by satisfying the formula (1), the hollow structure body of the present invention can suppress the first shaped product from being firstly broken when an external force is applied to the hollow structure body of the present invention at the first shaped product side. Therefore, the hollow structure body of the present invention shows an effect of obtaining excellent strength when used in application where compressive stress is applied at the first shaped product side. As such applications of the hollow structure body of the present invention, a bending load-carrying member such as a frame and a beam is exemplified, but the application is not limited thereto.

Vehicular Component

Next, vehicular components of the present invention will be explained. As described above, the vehicular components of the present invention is characterized by using the hollow structure body of the present invention. The vehicular components are not particularly limited as long as the hollow structure body of the present invention is used, and include, for example, a front bumper, a rear bumper, each pillar, a side sill, a floor cross member, and the like.

Any of the vehicular components of the present invention is available so long as those includes the hollow structure body of the present invention as described above. For example, those consisting of the hollow structure body of the present invention are available, and those formed by combining the hollow structure of the present invention and other components are available. The other components are appropriately selected depending on application of the vehicular components of the present invention, and are not particularly limited. A material constituting the other components may be also appropriately selected depending on application of the vehicular components of the present invention, and an arbitrary resin material or metallic material is available.

The present invention is not limited to the above embodiments. The above embodiments are one of examples. Even any embodiment having the substantially same structure as the technical concept recited in the claims of the present invention and showing the same operational effects is included in the technical range of the present invention.

EXAMPLES

Hereinafter, the present invention will be further specifically explained by showing examples and comparative examples.

Each value in the examples and the comparative examples is determined in accordance with the following manner.
(1) Average Fiber Length of Reinforcing Fibers in Each Fiber-Reinforced Resin Material An average fiber length of reinforcing fibers in each fiber-reinforced resin material is an average value of values obtained by heating a fiber-reinforced resin material for 1 hour in a furnace of 500° C. to remove a thermoplastic resin and measuring lengths of 100 reinforcing fibers randomly extracted down to 1 mm with a caliper. In a case where an average fiber length is lower than 1 mm, measurement is performed down to 0.1 mm with an optical microscope.

Figure 3:
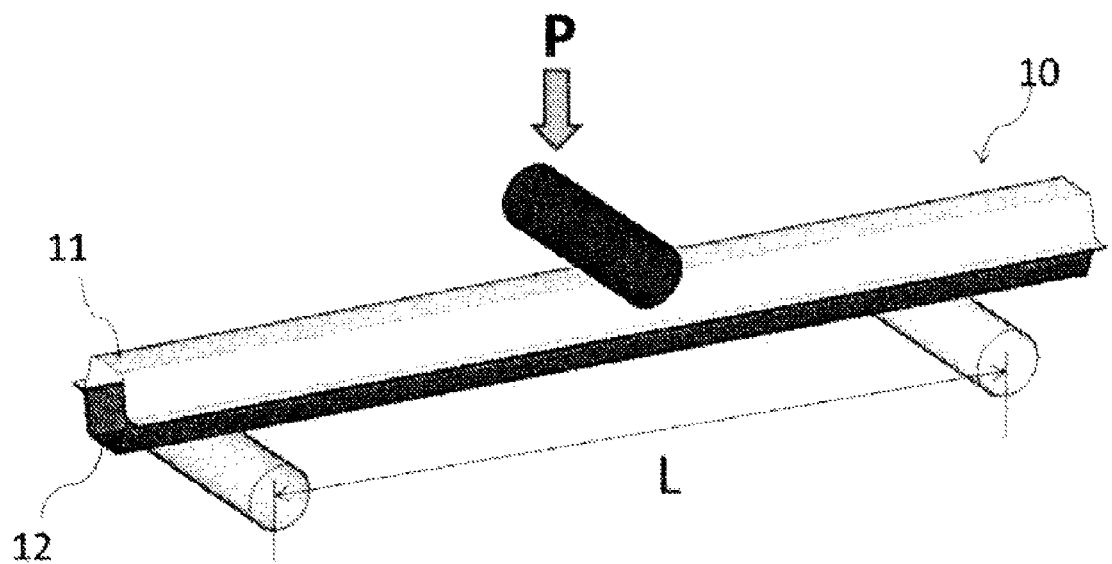
FIG. 3 is an explanation view explaining an evaluation manner of bending strength of a hollow structured body.

Meanwhile, since reinforcing fibers having a constant cut length are used in the present invention, a number average fiber length is the same as a weight average fiber length.
(2) Volume Content Rate of Reinforcing Fibers in Each Fiber-Reinforced Resin Material Volume content rate of reinforcing fibers in each fiber-reinforced resin material is calculated by using a density of the fiber-reinforced resin material measured by water immersion method and a relationship between a density of the reinforcing fibers and a density of the resin.
(3) Tensile Strength and Compressive Strength of Each Fiber-Reinforced Resin Material Tensile strength and compressive strength of each fiber-reinforced resin material is measured by using a test piece dried for 24 hours at 80° C. under vacuum in accordance with JIS K7164:2005 and JIS K7076:1991.
(4) Evaluation of Structure Strength of Hollow Structure Body Structure strength of hollow structure body in each example and each comparative example is evaluated by performing three-point bending test as shown in FIG. 3. When performing three-point bending test, a hollow structure body is set with a three-point bending test apparatus so that an external force P is directly and vertically applied to a top plane side of a first shaped product, and an external force when either of the first shaped product or a second shaped product is firstly broken is evaluated as a bending strength. In FIG. 3, L is 500.0 mm.

Reference Example 1

As reinforcing fibers, PAN-based carbon fibers, TENAX (registered trademark) STS40-24KS (average fiber diameter: 7 mm, density: about 1750 kg/m$^3$), manufactured by TOHO TENAX Co., Ltd., which were cut to have an average fiber length of 20 mm, and as a thermoplastic resin, nylon 6 resin, A1030 (density: about 1130 kg/m$^3$), manufactured by UNITIKA LTD., were used to form a fiber-reinforced resin material 1 in which the carbon fibers were two-dimensionally randomly oriented in in-plane directions by heating and pressing for 5 minutes under a pressure of 2.0 MPa with a press apparatus heated to 280° C.

The obtained fiber-reinforced resin material 1 had a volume content ratio of the reinforcing fibers of about 30 Vf %, an average fiber length of about 20 mm, a tensile strength of 350 MPa, a compressive strength of 250 MPa and a density of 1340 kg/m$^3$.

Reference Example 2

By using the same reinforcing fibers and the thermoplastic resin as those of Reference Example 1 and the same manner as in Reference Example 1, a fiber-reinforced resin material 2 having a volume content rate of the reinforcing fibers of about 22 Vf %, in which the carbon fibers were two-dimensionally randomly oriented in in-plane directions, was obtained.

The obtained fiber-reinforced resin material 2 had an average fiber length of about 20 mm, a tensile strength of 255 MPa, a compressive strength of 154 MPa and a density of 1280 kg/m$^3$.
<Shape of Hollow Structure Body of Fiber-Reinforced Resin Material>

Figure 4:
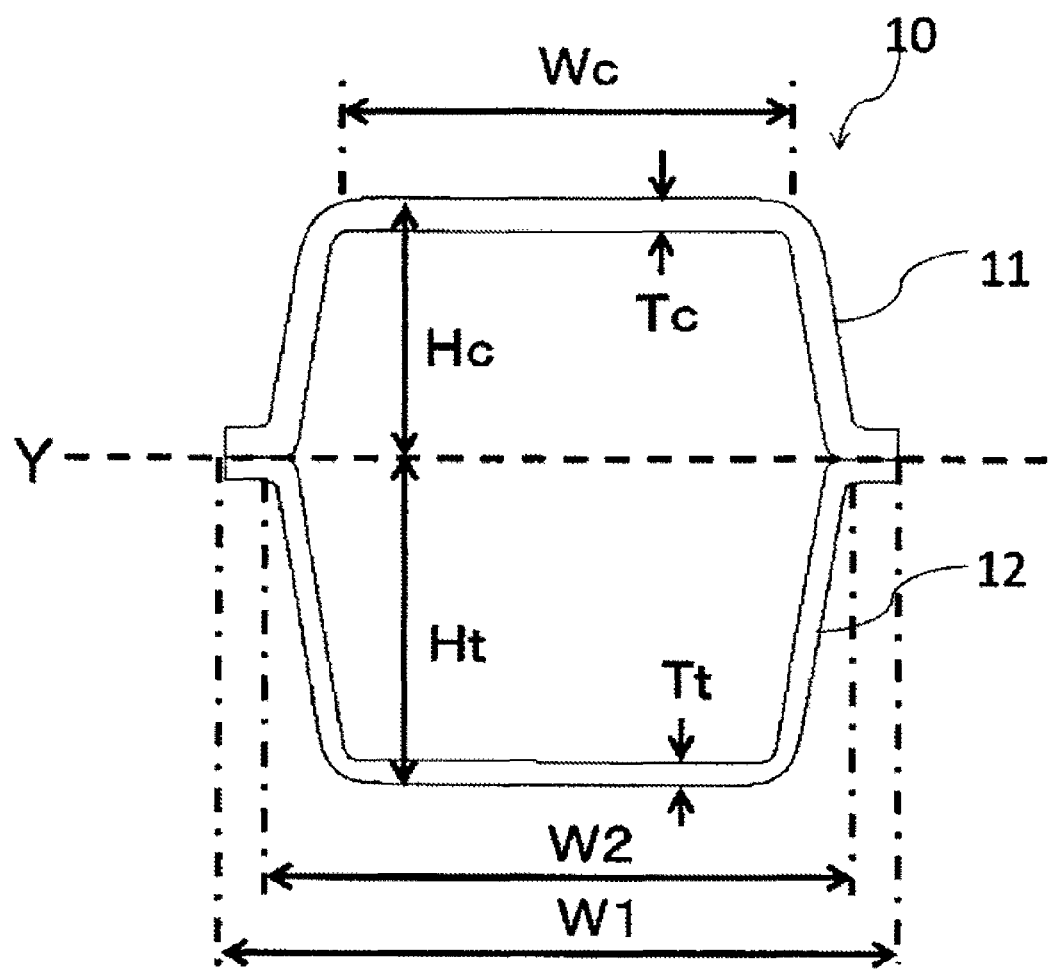
FIG. 4 is an explanation view explaining a shape of a hollow structure body in examples and comparative examples.

In hollow structure body in each example and comparative example, values (W1, W2, Wc, Hc, Ht, Tc, Tt) showing main size thereof are shown in FIG. 4. Also, a length of the hollow structure body in each example and comparative example was uniformly set to 600.0 mm.

Example 1

As a first fiber-reinforced resin material and a second fiber-reinforced resin material, the fiber-reinforced resin material 1 of Reference Example 1 was used. It was heated to 280° C. and subjected to cold pressing for 60 seconds under a pressure of 10 MPa to form a first shaped product and a second shaped product which have a hat shape. The first shaped product and the second shaped product were joined by vibration welding so that bottom plane parts thereof were faced to obtain a hollow structure body having a closed section. Main sizes of such a cross section of the hollow structure were as follows.

W1=150.0 mm, W2=120.0 mm, Wc=100.0 mm, Hc=55 mm, Ht=53.6 mm, Tc=5.0 mm, Tt=3.6 mm, Ac=1146.0 mm$^2$, At=825.0 mm$^2$

A weight of the structure body was 1585 g. Also, the ratio of the hollow structure body of this example was (Sc/St)=(Ac*σc)/(At*σt)≈1.0.

When a bending strength of the hollow structure body of Example 1 was evaluated by three-point bending test, the first shaped product and the second shaped product were broken at the almost same time. Also, the bending strength of the hollow structure body was 29.7 kN.

Example 2

As a first fiber-reinforced resin material and a second fiber-reinforced resin material, the fiber-reinforced resin material 1 of Reference Example 1 was used. It was heated to 280° C. and subjected to the same manner as in Example 1 to obtain a hollow structure body having a closed section. Size of each part was as follows.

W1=150.0 mm, W2=120.0 mm, Wc=100.0 mm, Hc=54.2 mm, Ht=70 mm, Tc=4.8 mm, Tt=3.2 mm, Ac=1113.0 mm², At=820.0 mm²

A weight of the structure body was 1547 g. Also, the hollow structure body of this example satisfied (Sc/St)=0.97.

When a bending strength of the hollow structure body of Example 2 was evaluated by three-point bending test, the first shaped product and the second shaped product were broken at the almost same time. Also, the bending strength of the hollow structure body was 31.4 kN.

Example 3

As a first fiber-reinforced resin material, the fiber-reinforced resin material 1 was used. It was heated to 280° C. and subjected to cold pressing under the same condition as in Example 1 to form a first shaped product having a hat shape. As a second fiber-reinforced resin material, the fiber-reinforced resin material 2 was used. It was heated to 280° C. and subjected to cold pressing under the above condition form a second shaped product having a hat shape. The first shaped product and the second shaped product were joined by vibration welding so that bottom plane parts thereof were faced to obtain a hollow structure body having a closed section. Size of each part was as follows.

W1=150.0 mm, W2=120.0 mm, Wc=100.0 mm, Hc=55.0 mm, Ht=55.0 mm, Tc=5.0 mm, Tt=4.9 mm, Ac=1146.0 mm², At=1123.0 mm²

A weight of the structure body was 1802 g. Also, the hollow structure body of this example satisfied (Sc/St)=1.0.

When a bending strength of the hollow structure body of Example 3 was evaluated by three-point bending test, the first shaped product and the second shaped product were broken at the same time. Also, the bending strength of the hollow structure body was 30.3 kN.

Comparative Example 1

As a first fiber-reinforced resin material and a second fiber-reinforced resin material, the fiber-reinforced resin material 1 of Reference Example 1 was used. It was heated to 280° C. and subjected to molding and vibration welding under the same condition as in Example 1 to obtain a hollow structure body having a closed section. Size of each part was as follows.

W1=150.0 mm, W2=120.0 mm, Wc=100.0 mm, Hc=55.0 mm, Ht=55.0 mm, Tc=5.0 mm, Tt=5.0 mm, Ac=1146.0 mm², At=1146.0 mm²

A weight of the structure body was 1843 g. Also, the hollow structure body of this example satisfied (Sc/St)=0.71.

When a bending strength of the hollow structure body of Comparative Example 1 was evaluated by three-point bending test, the first shaped product was firstly broken when an external force was reached about 30.5 kN, and the second shaped product was not broken. Also, the bending strength of the hollow structure body was 30.5 kN.

Comparative Example 2

As a first fiber-reinforced resin material and a second fiber-reinforced resin material, the fiber-reinforced resin material 1 of Reference Example 1 was used. It was heated to 280° C. and subjected to the same manner as in Example 1 to obtain a hollow structure body having a closed section. Size of each part was as follows.

W1=150.0 mm, W2=120.0 mm, Wc=100.0 mm, Hc=53.6 mm, =56.4 mm, Tc=6.4 mm, Tt=3.3 mm, Ac=1477.0 mm², At=753.0 mm²

A weight of the structure body was 1795 g. Also, the hollow structure body of this example satisfied (Sc/St)=1.39.

When a bending strength of the hollow structure body of Comparative Example 2 was evaluated by three-point bending test, the second shaped product was firstly broken when an external force was reached about 31.4 kN, and the first shaped product was not broken. Also, the bending strength of the hollow structure body was 31.4 kN.

INDUSTRIAL APPLICABILITY

The hollow structure body of the present invention is suitably applicable for use where the first shaped product is provided at a side at which compressive stress is received. As such an application, for example, vehicular components and the like can be exemplified.

While the invention has been described in detail and with reference to specific embodiments and examples thereof, various changes and modifications can be made therein without departing from the spirit and scope of the invention.

This application is based on Japanese Patent Application (Patent Application No. 2014-054962) filed on Mar. 18, 2014, the contents of which are incorporated herein by way of reference.

EXPLANATION OF REFERENCE SIGNS

10 Hollow structure body
11 First shaped product
12 Second shaped product
11a, 12a Bottom plane part
11b, 12b Top plane part
11c, 12c Standing plane part
X Axial direction of hollow structure
Y Interface between first shaped product and second shaped product

The invention claimed is:

1. A hollow structure body having a hollow structure, in which a first shaped product constituted by a first fiber-reinforced resin material containing first reinforcing fibers and a first matrix resin and a second shaped product constituted by a second fiber-reinforced resin material containing second reinforcing fibers and a second matrix resin are combined, wherein the first reinforcing fibers and the second reinforcing fibers contain carbon fibers, glass fibers, metal fibers, or aramid fibers, and in an arbitrary cross section in a direction perpendicular to an axial direction of the hollow structure, a ratio Sc/St between compressive strength Sc of a structure in the first shaped product and tensile strength St of a structure in the second shaped product satisfies formula (1):

$$(\sigma c/\sigma t)*(Hc/Ht)<(Sc/St)<(\sigma t/\sigma c)*(Hc/Ht) \quad \text{formula (1)}$$

Wherein Hc represents a height of the first shaped product,

Ht represents a height of the second shaped product, $\sigma c$ represents compressive strength of the first fiber-reinforced resin material in the axial direction, $\sigma t$ represents tensile strength of the second fiber-reinforced resin material in the axial direction, Ac represents a cross section area of the first shaped product in the cross section, At represents a cross section area of the second shaped product in the cross section,
Sc represents $\sigma c * Ac$, and
St represents $\sigma t * At$.

2. The hollow structure body according to claim 1, wherein when the height Hc of the first shaped product is the same as the height Ht of the second shaped product, the cross section satisfying the formula (1) satisfies formula (2):

$$(\sigma c/\sigma t) < (Tc*\sigma c)/(Tt*\sigma t) < (\sigma t/\sigma c) \quad \text{formula (2)}$$

wherein Tc represents an average thickness of the cross section of the first shaped product, and
Tt represents an average thickness of the cross section of the second shaped product.

3. The hollow structure body according to claim 1, wherein the first reinforcing fibers and the second reinforcing fibers are two-dimensionally randomly oriented.

4. The hollow structure body according to claim 3, wherein the ratio Sc/St satisfies $1.04*(\sigma c/\sigma t)*(Hc/Ht) \leq (Sc/St) \leq 0.96*(\sigma t/\sigma c)*(Hc/Ht)$.

5. The hollow structure body according to claim 1, wherein a volume content rate Vfc of the first reinforcing fibers in the first fiber-reinforced resin material and a volume content rate Vft of the second reinforcing fibers in the second fiber-reinforced resin material satisfy Vfc>Vft.

6. The hollow structure body according to claim 1, wherein an average fiber length Lc of the first reinforcing fibers and an average fiber length Lt of the second reinforcing fibers satisfy Lc>Lt.

7. The hollow structure body according to claim 1, wherein an average fiber diameter Dc of the first reinforcing fibers and an average fiber diameter Dt of the second reinforcing fibers satisfy Dc<Dt.

8. A vehicular component, comprising the hollow structure body according to claim 1.

9. The hollow structure body according to claim 1, wherein each of the first shaped product and the second shaped product comprises a bottom plane part and a top plane part, wherein the height Hc of the first shape product and the height Ht of the second shape product are defined by the respective distances between the bottom plane part and the top plane part; and
wherein the hollow structure is formed by joining the bottom plane part of the first shaped product to the bottom plane part of the second shaped product.

10. The hollow structure body according to claim 1, wherein the first matrix resin and the second matrix resin each is a thermoplastic resin.

* * * * *